United States Patent [19]

Morroni

[11] 4,033,627

[45] July 5, 1977

[54] QUICK RELEASE DEVICE

[75] Inventor: Pino D. Morroni, Warren, Mich.

[73] Assignee: Pino International Ltd., Warren, Mich.

[22] Filed: Sept. 8, 1975

[21] Appl. No.: 611,176

[52] U.S. Cl. .............................. 301/111; 301/124 R; 280/279; 280/288

[51] Int. Cl.² ........................................ B62K 25/02

[58] Field of Search ........................... 301/111–122, 301/105 B, 124 R, 128; 269/236; 280/279, 288

[56] References Cited

UNITED STATES PATENTS

| 2,677,984 | 5/1954 | Jay | 280/288 X |
| 3,922,018 | 11/1975 | Shook | 301/105 B |

FOREIGN PATENTS OR APPLICATIONS

| 1,053,985 | 10/1953 | France | 301/111 |
| 423,500 | 7/1947 | Italy | 301/111 |
| 464,381 | 6/1951 | Italy | 301/111 |
| 460,058 | 10/1950 | Italy | 301/111 |
| 482,341 | 6/1953 | Italy | 301/124 |
| 478,512 | 2/1953 | Italy | 301/111 |
| 457,547 | 5/1950 | Italy | 280/288 |

Primary Examiner—Robert B. Reeves
Assistant Examiner—Charles A. Marmor
Attorney, Agent, or Firm—McGlynn and Milton

[57] ABSTRACT

A quick release assembly for supporting a bicycle wheel hub on a bicycle frame component. The assembly includes an elongated rod having an abutment nut threadedly disposed on one end thereof and a cam clamping assembly disposed on the other end. The clamping assembly includes a cup-shaped clamping head for rotatably supporting a cam member having an eccentric cam disposed within the cup-shaped clamping head. The eccentric cam is rotatably disposed in openings in a cylindrical reaction member. The cylindrical reaction member has a bore extending thereinto from one face to an annular flange adjacent the second face and the end of the rod has an enlarged head disposed in the bore of the reaction member and engaging the annular flange. The reaction member and the rod are separate members and the end of the rod has an arcuate recess concentric with the eccentric cam for engaging the eccentric cam to prevent rotation of the rod. The cam member has a handle extending therefrom for rotating the cam to move the clamping head relative to the reaction member between a clamping position where the rod is placed in tension and a release position for removing the bicycle wheel hub from the bicycle frame.

15 Claims, 5 Drawing Figures

QUICK RELEASE DEVICE

This invention relates to a quick release assembly for supporting a bicycle wheel hub on a bicycle frame.

Such quick release assemblies normally include a rod with a threaded nut on one end thereof and a cam actuated clamping assembly on the other end thereof whereby the rod may extend through the hub of a bicycle wheel which is placed in the front steering fork or rear receiving portion of a bicycle frame for clamping the wheel hub assembly to the bicycle frame. Known quick release assemblies are shown in U.S. Pat. No. 3,807,761 and in Italian Pat. No. 939,674. The camming assembly in these prior art devices typically include a cup-shaped clamping head disposed about an enlarged head portion integral with the rod with the clamping head rotatably supporting a cam member having an eccentric cam extending through a bore in the enlarged head of the rod whereby upon rotation of the cam member there is effected relative longitudinal movement between the clamping head and the enlarged head of the rod. In an effort to improve bicycles and bicycle components, there has been a continual effort to reduce the weight of the bicycle components without sacrificing strength. In the prior art assemblies the rod and the enlarged head on the rod are integral and must be fabricated from bar stock which has a diameter or is at least as large as the enlarged head on the rod. Because of the machining effort required to make the rod with the intergral enlarged head, it is not practical to use lightweight materials which are in themselves sometimes very expensive as, for example, titanium.

The subject invention provides an improved quick release assembly which possesses the requisite strength characteristics yet is significantly lighter in weight than the prior art quick release assemblies. In accordance with the instant invention, a clamping means is disposed at one end of the rod and includes a separate reaction member connected to the rod and surrounded by a clamping head with an actuating means operatively interconnecting the clamping head and the reaction member for effecting the relative movement between the clamping head and the reaction member longitudinally of the rod. Such a combination of components allows the assembly to be manchined and fabricated at a reasonable cost yet utilizing lightweight materials such as titanium.

Other advantages of the present invention will be readily appreciated as the same becomes better understood by reference to the following detailed description when considered in connection with the accompanying drawings wherein.

Figure 1:
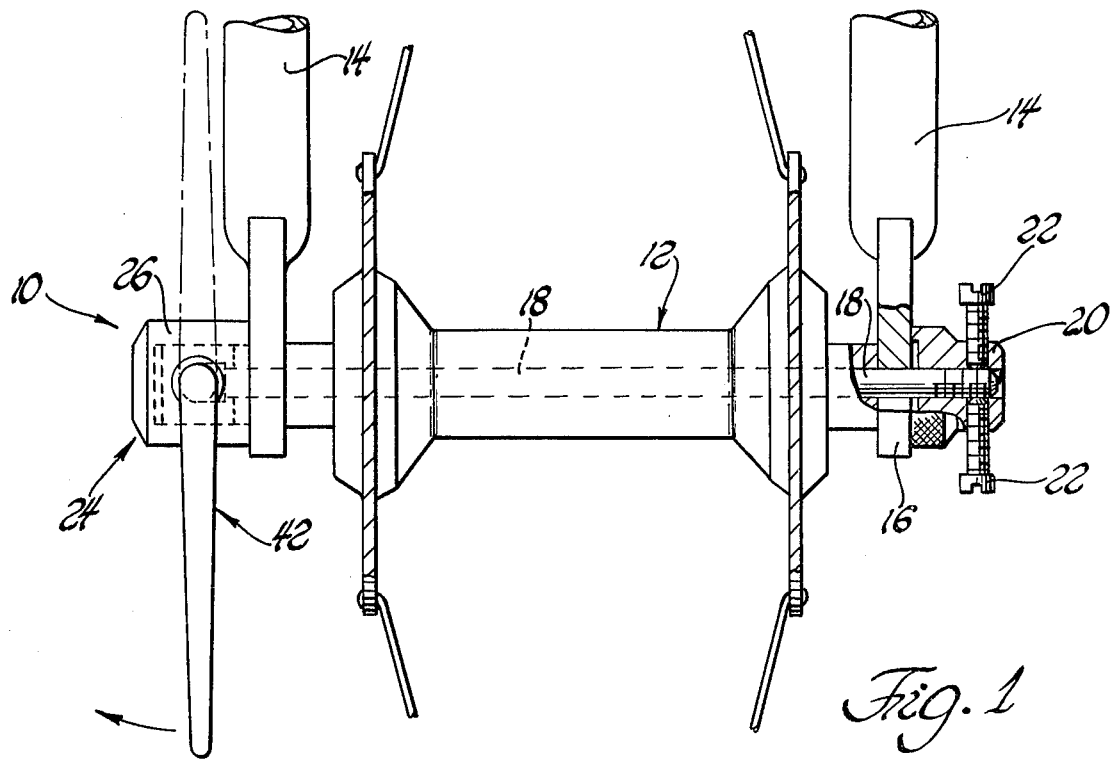
FIG. 1 is a front elevational view partially broken away and in cross section of a quick release assembly constructed in accordance with the instant invention mounting a bicycle wheel hub on the lower legs of the front fork of a bicycle frame.

Referring now to the drawings, a quick release assembly constructed in accordance with the instant invention is generally shown at 10 in FIG. 1. The quick release assembly 10 supports a bicycle wheel hub assembly generally indicated at 12 on the lower legs 14 of the front fork of a bicycle frame. As is well known in the art, the lower ends of the fork legs 14 are bifurcated, as indicated at 16, to define slots for receiving the quick release assembly. The hub assembly 12 includes bearings etc., and is of the type well known in the art.

The quick release assembly 10 includes an elongated rod 18 having first and second ends. Abutment means comprising the threaded nut 20 is threadedly disposed on the first end of the rod 18 for engaging the bicycle frame. The threaded nut 20 includes locking screws 22 which are utilized to prevent rotation of the locking nut or adjustment nut 20 on the rod 18. As is well known in the art, the nut 20 is threaded onto the first end of the rod 18 to an adjusted position accommodating the distance between the fork legs 14 and thereafter the locking screws are tightened to prevent further rotation of the nut 20.

Figure 2:
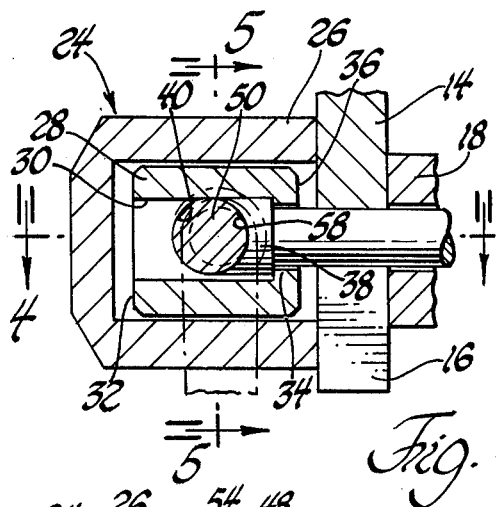
FIG. 2 is a fragmentary cross-sectional view of the clamping means utilized in the quick release assembly of the subject invention and shown in the clamping position.
Figure 3:
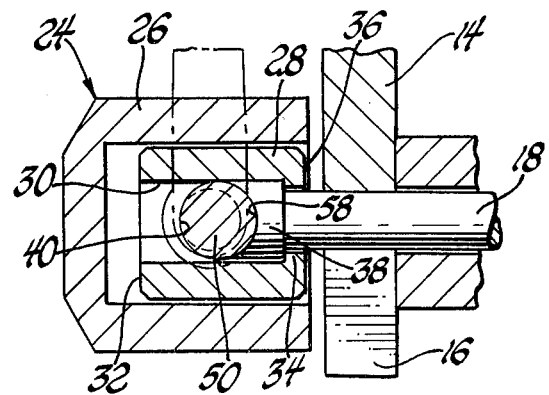
FIG. 3 is a fragmentary cross-sectional view similar to FIG. 2 but showing the clamping means in the release position.
Figure 4:
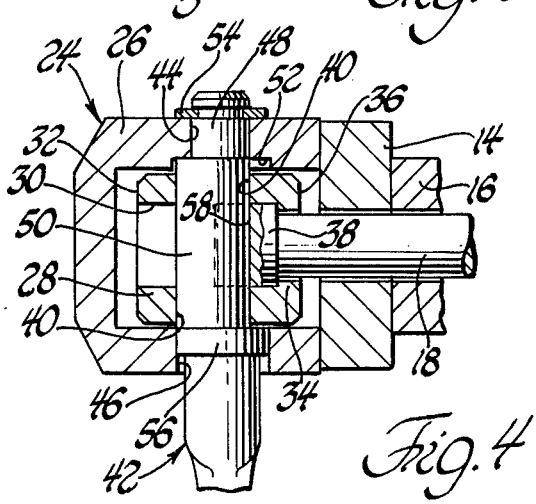
FIG. 4 is a fragmentary cross-sectional view taken substantially along line 4—4 of FIG. 2.
Figure 5:
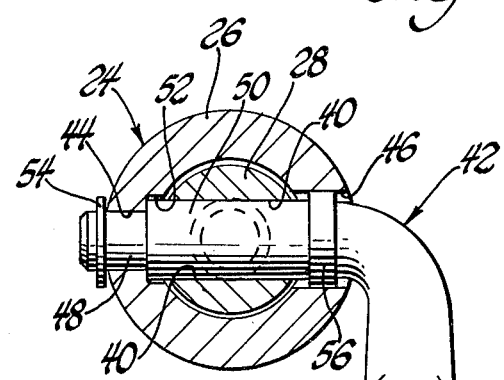
FIG. 5 is a fragmentary cross-sectional view taken substantially along line 5—5 of FIG. 2.

The quick release assembly 10 also includes a clamping means generally indicated at 24 and disposed on the second end of the rod 18 for movement longitudinally of the rod 18 between a clamping position as shown in FIGS. 1 and 2, to clamp a bicycle wheel hub assembly 12 on a bicycle frame by placing the rod 18 in tension and a release position, as shown in FIG. 3, to release the rod from tension for releasing the wheel hub assembly 12 from the bicycle frame. Although not shown, small helically coiled springs are normally disposed between the nut 20 and the adjacent leg 14 and between the clamping means 24 and the adjacent leg 14.

The clamping means 24 includes a cup-shaped clamping head 26 for clamping engagement with the bicycle frame. The clamping head 26 is cylindrical and hollow with a closed end or base to define the cup-shape with the open end of the cup-shaped disposed for engagement with the bicycle frame.

The clamping means 24 also includes a reaction member 28. The reaction member 28 is an integral member separate from the clamping head 26 and separate from the rod 18. The reaction member 28 is cylindrical or tubular with a bore 30 extending thereinto from a first end face 32 and terminating in an annular flange or shoulder 34 which is disposed adjacent the second face 36. Actually, the annular shoulder or flange 34 defines a portion of the second end face 36 of the reaction member 28.

The second end of the rod 18 includes an enlarged head 38 disposed in the bore 30 and in abutting engagement with the flange 34. The bore 30 is circular in cross section and the enlarged head 38 is also cylindrical and is in sliding engagement with the bore 30. The enlarged head 38 is movable along the bore 30 and out of the reaction member 28 for allowing the reaction member 28 to move along the rod 18 toward the first end thereof which supports the nut 20. Upon removal of the nut 20, the reaction member 28 may thus be separated from the rod 18. The flange 34 and the head 38 define connecting means for connecting the reaction member 28 to the rod 18 for placing the rod 18 in tension.

The reaction member 28 has circular openings or opening 40 extending diametrically therethrough transversely to the axis of the rod 18.

Clamping means 24 also includes actuation means defined by a cam member generally indicated at 42. The cam member 42 operatively interconnects the clamping head 26 and the reaction member 28 for effecting relative movement between the clamping head 26 and the reaction member 28 in a direction longitudinally of the rod 18 between the clamping position shown in FIG. 2 and the release position shown in FIG. 3. The clamping head 26 includes first and second apertures 44 and 46 respectively extending diametrically through the clamping head 26 and transversely or perpendicularly to the axis of the rod 18. The cam member 42 is rotatably supported in the apertures 44 and 46. The cam member 42 includes a stub shaft 48 rotatably supported in the first aperture 44. The cam member 42 includes a circular eccentric cam 50. The eccentric cam 50 is circular in cross section about an axis which is parallel to and off-set from the axis of rotation of the cam member 42 relative to the clamping head 26. The eccentric cam 50 is disposed in the openings 40 of the reaction member 28. The aperture 44 has a circular counterbore 52 on the interior of the clamping head 26 for rotatably receiving the end of the eccentric cam 50. The end of the eccentric cam 50 is planar or lies in a plane perpendicular to the axis of rotation of the cam member 42 and engages the bottom of the counterbore 52.

A snap ring 54 is disposed in a groove in the distal end of the stub shaft portion 48 on the exterior of the clamping head 26 for retaining the cam member 42 assembled to the clamping head 26.

The aperture 46 in the clamping head 26 is of a larger diameter than the aperture 44 and the cam member 42 includes an enlarged circular bearing ring or flange 56 rotatably supported in the aperture 46. It will be appreciated, of course, that the aperture 44 and 46 are concentric to the axis of rotation of the cam member 42.

The second end of the rod 18 at the enlarged head 38 thereof includes stop means engaging the eccentric cam 50 for preventing rotation of the rod 18 about its longitudinal axis relative to the cam member 42 and/or the clamping head 26. More specifically, the stop means includes an arcuate recess 58 in the end face of the enlarged head portion 38 at the second end of the rod 18. The arcuate recess 58 is disposed on a circular path concentric with the eccentric cam 50 and in mating engagement therewith for preventing rotation of the rod 18. The arcuate surface 58 is, of course, also concentric of the same diameter and aligned with the openings 40 in the reaction member 28.

It will be appreciated that the rod 18 may be made of a high strength material easily machined as the enlarged head 38 is integral therewith and need not be very large. At the same time the separate reaction member 28 may be made of a very lighweight high strength material such as titanium to significantly reduce the weight in the assembly.

The significance of the counterbore 52 is that the cam member 42 may be inserted with the end of the cam 50 engaging the bottom of the counterbore 52 and the snap ring 54 placed in position with a built-in operating tolerance. This is distinguished from the prior assemblies which include a conical end of the cam and a threaded nut on the end of the stub shaft, which threaded nut must be properly tightened to attain the proper operating clearance.

As will be appreciated, the quick release assembly may be associated with a wheel hub and placed in position on a bicycle frame where the threaded nut 20 is adjusted longitudinally or axially of the rod to a position which, when the entire assembly is connected to a bicycle frame, movement of the handle of the cam member 42 from the phantom position shown in FIG. 3 to the phantom position shown in FIG. 2, will clamp the components together and place the rod 18 in tension. In other words, the adjustment nut 20 is moved axially of the rod 18 to an adjusted position which allows the total assembly to be clamped upon manual manipulation of the clamping assembly 24. The assembly is shown in the clamping position in FIG. 1 and, when it is desired to quickly remove a bicycle wheel from the frame assembly, the handle of the cam member 42 is moved 180° from the position shown in full lines in FIG. 1 to the position shown in phantom in FIG. 1 to move the clamping assembly 24 from the clamping position shown in FIG. 2 to the release position shown in FIG. 3.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A quick release assembly for supporting a bicycle wheel hub on a bicycle frame comprising: an elongated rod having first and second ends; abutment means disposed on said first end of said rod for engaging a bicycle frame; and clamping means disposed on said second end of said rod for movement longitudinally of said rod between a clamping position to clamp a wheel hub on a bicycle frame by placing said rod in tension and a release position to release said rod from said tension for releasing the wheel hub from the bicycle frame, said clamping means including a clamping head for engaging a bicycle frame, a reaction member separate from said clamping head and separate from said rod, connecting means connecting said reaction member to said second end of said rod for placing said rod in tension, and actuation means operatively interconnecting said clamping head and said reaction member for effecting relative movement between said clamping head and said reaction member in a direction longitudinally of said rod between said clamping and release positions, said actuation means including a cam member rotatably supported by said clamping head for rotation about a rotational axis which extends transversely of said rod, said cam member having an eccentric cam engaging said reaction member for effecting said relative movement between said clamping head and said reaction member, said second end of said rod including stop means engaging said eccentric cam for preventing rotation of said rod relative to said cam member and said clamping head, said eccentric cam being circular in cross section about an eccentric axis which is laterally displaced from said rotational axis, said stop means including an arcuate recess in said second end of said rod and concentric with said eccentric cam.

2. An assembly as set forth in claim 1 wherein said abutment means is removably disposed on said rod and said reaction member is movable longitudinally of said rod toward said first end thereof and may be removed from said first end of said rod upon removal of said abutment means.

3. An assembly as set forth in claim 1 wherein said abutment means is in threaded engagement with said first end of said rod for movement longitudinally of said rod and for removal therefrom.

4. An assembly as set forth in claim 1 wherein said reaction member is cylindrical with a bore extending thereinto from a first face thereof and terminating in an annular flange adjacent the second face thereof, said second end of said rod having an enlarged head disposed in said bore and engaging said flange, said connection means being defined by said head and said flange.

5. An assembly as set forth in claim 4 wherein said enlarged head is movable along said bore and out of said reaction member for allowing said reaction member to move along said rod toward said first end thereof.

6. An assembly as set forth in claim 5 wherein said clamping head is a cup-shaped member surrounding said reaction member, said reaction member having circular openings extending diametrically therethrough transversely to said rod, said eccentric cam being disposed in said openings in said reaction member for effecting said relative movement between said clamping head and said reaction member.

7. An assembly as set forth in claim 6 wherein said enlarged head is integral with said rod and said arcuate recess is concentric with said openings in said reaction member.

8. An assembly as set forth in claim 7 wherein said clamping head includes first and second apertures extending diametrically therethrough for rotatably supporting said cam member, said cam member including a stub shaft rotatably supported in said first aperture, said first aperture having a circular counterbore on the interior of said clamping head for rotatably receiving the end of said eccentric cam.

9. An assembly as set forth in claim 8 wherein said end of said eccentric cam is planar to engage the bottom of said counterbore about the periphery of said first aperture.

10. An assembly as set forth in claim 9 including a snap ring engaging said stub shaft exteriorly of said clamping head for retaining said cam member assembled to said clamping head.

11. An assembly as set forth in claim 1 wherein said clamping head is a cup-shaped member surrounding said reaction member and includes first and second apertures extending diametrically therethrough, said cam member being rotatably supported in said first and second apertures, said cam member including a stub shaft extending through said first aperture and rotatably supported therein, said first aperture having a circular counterbore on the interior of said clamping head, said cam member including an eccentric cam having an end disposed in said counterbore.

12. An assembly as set forth in claim 11 wherein said end of said eccentric cam is planar to engage the bottom of said counterbore about the periphery of said aperture.

13. An assembly as set forth in claim 12 including a snap ring engaging said stub shaft exteriorly of said clamping head for retaining said cam member assembled to said clamping head.

14. A quick release assembly for supporting a bicycle wheel hub on a bicycle frame comprising: an elongated rod having first and second ends; abutment means disposed on said first end of said rod for engaging a bicycle frame; and clamping means disposed on said second end of said rod for movement longitudinally of said rod between a clamping position to clamp a wheel hub on a bicycle frame by placing said rod in tension and a release position to release said rod from said tension for releasing the wheel hub from the bicycle frame, said clamping means including a cup-shaped clamping head having first and second apertures extending diametrically therethrough, a cam member rotatably supported in said first and second apertures, said cam member including a stub shaft extending through said first aperture and rotatably supported therein, said first aperture having a circular counterbore on the interior of said clamping head, said cam member including an eccenric cam having an end disposed in said counterbore, said counterbore having a planar bottom and said end of said eccentric cam being planar to engage the bottom of said counterbore about the periphery of said aperture, said counterbore having a radius larger than the radial eccentricity of said cam.

15. An assembly as set forth in claim 14 including a snap ring engaging said stub shaft exteriorly of said clamping head for retaining said cam member assembled to said clamping head.

* * * * *